United States Patent
Kuryatnyk et al.

(10) Patent No.: US 11,008,258 B2
(45) Date of Patent: May 18, 2021

(54) PULVERULENT MORTAR COMPOSITION HAVING IMPROVED ADHESION

(71) Applicant: BOSTIK S.A., Colombes (FR)

(72) Inventors: Tetyana Kuryatnyk, Moissy Cramayel (FR); Philippe Mabire, Courcouronnes (FR); Stephane Fouquay, Mont Saint Aignan (FR)

(73) Assignee: BOSTIK S.A., Colombes (FR)

( * ) Notice: Subject to any disclaimer, the term of this patent is extended or adjusted under 35 U.S.C. 154(b) by 0 days.

(21) Appl. No.: 15/153,229

(22) Filed: May 12, 2016

(65) Prior Publication Data

US 2016/0304399 A1    Oct. 20, 2016

Related U.S. Application Data

(63) Continuation of application No. 13/813,783, filed as application No. PCT/FR2011/051757 on Jul. 20, 2011, now abandoned.

(30) Foreign Application Priority Data

Aug. 3, 2010   (FR) ...................... 1056412

(51) Int. Cl.
| | |
|---|---|
| C04B 28/18 | (2006.01) |
| C04B 28/02 | (2006.01) |
| C04B 40/00 | (2006.01) |
| C04B 24/04 | (2006.01) |
| C04B 7/02 | (2006.01) |
| C04B 28/28 | (2006.01) |
| C04B 103/00 | (2006.01) |
| C04B 111/00 | (2006.01) |
| C04B 111/70 | (2006.01) |

(52) U.S. Cl.
CPC ............... *C04B 28/18* (2013.01); *C04B 7/02* (2013.01); *C04B 24/045* (2013.01); *C04B 28/02* (2013.01); *C04B 28/28* (2013.01); *C04B 40/0039* (2013.01); *C04B 2103/0075* (2013.01); *C04B 2111/00517* (2013.01); *C04B 2111/00637* (2013.01); *C04B 2111/00672* (2013.01); *C04B 2111/70* (2013.01)

(58) Field of Classification Search
CPC .................................................. C04B 24/045
See application file for complete search history.

(56) References Cited

U.S. PATENT DOCUMENTS

| | | |
|---|---|---|
| 3,466,822 A | 9/1969 | Piccard et al. |
| 3,656,979 A | 4/1972 | Striebel et al. |
| 7,445,849 B2 | 11/2008 | Apitz et al. |
| 8,092,592 B2 | 1/2012 | Buerge et al. |
| 8,535,436 B2 | 9/2013 | Weichmann et al. |
| 2009/0107363 A1 | 4/2009 | Laudet et al. |
| 2009/0297702 A1 | 12/2009 | Weichmann et al. |
| 2010/0190888 A1 | 7/2010 | Gaeberlein et al. |
| 2011/0067604 A1 | 3/2011 | Buerge et al. |
| 2011/0209644 A1 | 9/2011 | Weichmann et al. |
| 2012/0328788 A1 | 12/2012 | Willimann et al. |

FOREIGN PATENT DOCUMENTS

| | | |
|---|---|---|
| DE | 2006-016797 | 12/2006 |
| EP | 2128110 | 12/2009 |
| WO | 2006-084588 | 8/2006 |
| WO | 2010-028870 | 3/2010 |
| WO | 2011-073224 | 6/2011 |

OTHER PUBLICATIONS

International Search Report for International Application No. PCT/FR2011/051757; dated Nov. 15, 2011.
PCI Augsburg GMBH; "Dry Mortar Contains Dust-Reducing Additive, e.g., Alcohol, Polyethylene Glycol, Polyvinyl Alcohol, Ether, Organic Acid, Alkanolamine, Ester, Ketone, Silicone Oil, Polysiloxane-Polyether Copolymer, Silicic Acid, Animal or Vegetable Oil or Wax"; Espacenet; Dec. 28, 2006; English Abstract of DE 20 2006 016797.
Henkel KGAS; "Use of Aliphatic Hydrocarbons and Hydrocarbon Mixtures in Powdery Chemical Products for Construction"; Espacenet; Aug. 17, 2006; English Abstract of WO2006 084588.

*Primary Examiner* — Liam J Heincer
(74) *Attorney, Agent, or Firm* — Millen, White, Zelano and Branigan, P.C.

(57) ABSTRACT

Pulverulent mortar composition comprising a mineral binder, an inert material in the form of aggregate capable of being agglomerated in aqueous phase by means of said binder, and 0.2 to 1% of a fluid additive comprising 25 to 100% of a linear or branched, saturated or unsaturated hydrocarbon compound (i) which is liquid at room temperature and which includes one or more —COO— ester groups, the total weight of which, relative to the molar mass of said compound, is between 20 and 50%. Use for preparing an adhesive mortar for fixing ceramic tiles.

11 Claims, No Drawings

PULVERULENT MORTAR COMPOSITION HAVING IMPROVED ADHESION

The present invention relates to a pulverulent mortar composition intended in particular for use as tiling cement, which enables improved adhesion characteristics to be obtained for cemented ceramic tiles, especially after contact with water, while exhibiting a reduced amount of inhalable dusts.

Mortars intended for use as tiling cement are also called adhesive mortars. They are well known and are widely used for fixing tiling (also referred to as ceramic tiles or coatings) to both horizontal (grounds or screeds) and vertical (walls and partitions) substrates, either on the interior or exterior of dwellings. They take the form of powder and comprise various ingredients, especially:

binders, and
granules of inert materials which can be agglomerated in aqueous phase by means of said binders to form an aggregate.

The binders employed may be inorganic or organic.

Inorganic binders include hydraulic binders (that is, binders which are insoluble in water and which set and harden by chemical reaction with water) and also nonhydraulic binders (in other words, binders which are soluble in water and which harden by drying).

Hydraulic inorganic binders include the following:
cements, such as Portland cement, composite cements (a mixture of Portland cement with another product such as blast furnace slag, fly ash, calcined shales, limestone, metakaolin), high-alumina cements, and sulfoaluminate cements;
hydraulic lime.

Nonhydraulic inorganic binders include rich lime and sulfates such as gypsum, plaster, and anhydrite.

The organic binders are generally based on resins of animal or vegetable origin or, more usually, on synthetic resins.

Examples that may be given of granules of inert materials include the following: sand (especially silica sand or limestone sand), stone chippings, expanded clay, pozzolan, glass beads, barytes, hematites, slags, or else ground brick or ground concrete.

The powder form adopted by a mortar, especially an adhesive mortar, is obtained industrially by simple mixing of its various ingredients, which are themselves generally in the form of solids in a pulverulent state. This powder is employed, in use, by blending with water (also referred to as mixing). The resulting product has a uniform, plastic appearance, and a consistency which allows it, in the case of an adhesive mortar, to be spread over the substrate to be tiled and/or over the back of the tiles (using a trowel and/or a toothed spatula), to give an even layer with a thickness of several millimeters that joins the ceramic tiles to the substrate, resulting in a cohesive assembly which is stable over time.

The solid particles which make up the mortars have a size which may range from around ten to several hundred micrometers and in some cases may be capable of producing emission of dusts, in suspension in the air, which are potentially inhalable. This emission of inhalable dusts, which may take place both at the stage of industrial manufacture and at the time of handling of the product by the user, before and during mixing with water, is a disadvantage of mortars, particularly of adhesive mortars, that gives rise to workplace hygiene problems and is the subject of regulation relating to employee protection.

Patent application WO 2006/084588 relates to the problem of reducing dust emissions during the handling of cement-based or hydraulically setting pulverulent materials. For that purpose it teaches the use of hydrocarbons or mixtures of hydrocarbons, especially liquid hydrocarbons, and preferably of saturated aliphatic hydrocarbons such as mineral oils.

International application WO 2007/051817 recommends the incorporation into the mortar composition of a fluid additive composed of at least one apolar organic hydrocarbon substance selected from mineral oils, paraffinic oils, paraffins, or polyolefins. According to this application, the incorporation of said fluid additive into the mortar composition does not give rise to any impairment of its physicochemical characteristics, including the adhesion characteristics.

Adhesion characteristics feature at the forefront of the end performance attributes expected from adhesive mortars for tiling (or ceramic coatings). These features are generally quantified by determining the maximum breaking stresses, which are measured by removal resistance tests carried out on tiles cemented to a concrete slab under standard conditions, in accordance with European standard EN 1348. These tests may be carried out on an assembly which, after being produced, has been first of all:

either simply stored for approximately 1 month at ambient temperature (for measuring the dry adhesion),
or immersed in water for 3 weeks (for measuring the adhesion after water contact).

The determination of the adhesion after water contact is particularly important in evaluating the stability of the assembly that results from the bonding of a ceramic coating to an exterior substrate of a dwelling, which is therefore exposed to the weather: this tiled substrate may be, for example, a tiled facade or tiled patio, or else tiling intended for coating a swimming pool.

In contrast to the teaching of document WO 2007/051817, the applicant has now found, on the basis of a large number of tests, that the effect of introducing an apolar organic hydrocarbon substance, such as a hydrocarbon oil, into an adhesive mortar is to reduce the adhesion, and more particularly the adhesion after water contact.

The aim of the present invention is to provide a pulverulent mortar composition, which can be used in particular as an adhesive mortar, and which comprises a fluid additive which lowers the emission of inhalable dusts by the composition, and which offers, moreover, excellent dry adhesion performance and, more particularly, adhesion performance after water contact.

The invention accordingly provides a pulverulent mortar composition which comprises:

from 10% to 60% of an inorganic binder,
from 40% to 90% of an inert material in granule form that can be agglomerated in aqueous phase by means of said binder,
from 0.2% to 1% of a fluid additive comprising from 25% to 100% of a saturated or unsaturated, linear or branched hydrocarbon compound (i) which is liquid at ambient temperature and which includes one or more ester groups —COO— of which the total weight, relative to the molar mass of said compound (i), is between 20% and 50%.

It has been found that the selection of this specific polar organic compound leads to an adhesive mortar which, in addition to reduced emission of inhalable dusts, possesses high performance properties in terms of adhesion, and especially of adhesion after water contact. Advantageously, the adhesion after water contact is maintained at a very high level, greater than or equal to 0.95 MPa.

In the absence of indications to the contrary, it is specified that the percentages used in the present text to quantify the amount of components in the composition according to the invention or of the fluid additive are weight/weight percentages. Also, the indefinite article "a" or "an", used to denote the components of said composition or said additive, should be understood to mean "one or more" components.

The inorganic, hydraulic or nonhydraulic, binder employed in the mortar composition according to the invention may be selected from those recited above, either alone or as a mixture.

The granules of inert material may also be selected from the materials recited above, alone or in a mixture.

As inorganic binder it is preferred to use cement, and more preferably Portland cement and/or high-alumina cement, and as granules of inert material it is preferred to use sand, especially silica sand or limestone sand.

The compound (i) included in the fluid additive incorporated into the pulverulent composition according to the invention is preferably a mono-, di-, tri- or tetra-ester (or a mixture of such compounds), which in the remainder of the present text is referred to by the term "ester oil".

According to one preferred variant of the composition according to the invention, the compound (i) is selected from the group consisting of:
(a) mono-esters of formula:

  (I)

in which:
R$^1$ and R$^2$ are identical or different and represent a saturated or unsaturated, linear or branched hydrocarbon radical which contains from 1 to 10 carbon atoms and is optionally substituted by an —OH or —SH group;
A represents an ester group of formula —(CO)O— or —O(CO)—;
(b) di-esters of formula:

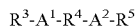  (II)

in which:
R$^3$ and R$^5$ are identical or different and represent a saturated or unsaturated, linear or branched hydrocarbon radical which contains from 1 to 20 carbon atoms and is optionally substituted by an —OH or —SH group;
R$^4$ is a divalent radical deriving from the monovalent radical having the same meaning as radicals R$^3$ or R$^5$ defined above;
A$^1$ and A$^2$ are identical or different and have the same meaning as the radical A defined above;
(c) tri-esters obtained by condensing:
a saturated or unsaturated, linear or branched carboxylic acid which contains from 2 to 20 carbon atoms and is optionally substituted by an —OH or —SH group, with
a saturated or unsaturated, linear or branched hydrocarbon compound which contains from 3 to carbon atoms, of which 3 separate atoms are each bonded to an —OH group; and
(d) tetra-esters obtained by condensing:
a saturated or unsaturated, linear or branched carboxylic acid which contains from 2 to 20 carbon atoms and is optionally substituted by an —OH or —SH group, with
a saturated or unsaturated, linear or branched hydrocarbon compound which contains from 4 to 10 carbon atoms, of which 4 separate atoms are each bonded to an —OH group.

Examples that may be given of compounds (i) are the following compounds, which are widely available commercially:
as mono-ester: 2-ethylhexyl lactate (also called 2-ethylhexyl 2-hydroxypropanoate) of formula:

(molar weight of the —COO— group: 22%)
as di-ester:
the diethyl ester of adipic acid (or diethyl adipate), of formula:

(molar weight of the —COO— group: 43%)
the diisobutyl ester of adipic acid (or diisobutyl adipate), of formula:

(molar weight of the —COO— group: 34%)
as tri-ester, the glycerol triester of capric acid (or glycerol tricaprylate), of formula:

(molar weight of the —COO— group: 24%)
as tetra-ester, the pentaerythritol tetraester of capric acid (or pentaerythritol tetracaprylate), of formula:

(molar weight of the —COO— group: 23%).

A polar organic compound (i) including one or more ester groups for a total weight of between 30% and 50% is more particularly preferred, such as diethyl and/or diisobutyl adipate.

According to one variant of the composition according to the invention, the fluid additive may comprise, further to the 25% to 100% of the aforementioned polar organic compound (i), from 0% to 75% of an apolar organic compound (ii) which is liquid at ambient temperature. Said compound (ii) is generally selected from mineral oils, paraffinic oils, polyolefins, or mixtures of these substances. It is referred to hereinafter as "hydrocarbon oil". Examples of commercial products covered by (ii) include the following:

Lytol and Semtol 70/28, which are white mineral oils sold by Sonneborn, having respective viscosities (measured at 23° C. by a Brookfield viscometer fitted with spindle 2V100, in accordance with standard ASTM D 445) as follows: 28 and 56 mPa·s.

Hydroseal G3H (from Total), which is a mixture of hydrotreated petroleum middle distillates having a viscosity (measured under the same conditions as above) of 24 mPa·s.

Nexbase® 2002 (Neste Oil), which is a synthetic oil consisting essentially of hydrogenated, dimerized 1-decene.

Whereas the introduction into an adhesive mortar composition of a fluid additive consisting exclusively of the compound (ii) results in a decrease in the adhesion characteristics, the introduction of the compound (i) or of a mixture thereof with the compound (ii) in the proportions indicated advantageously allows the adhesion performances to be maintained, including the adhesion after water contact, at a very high level, preferably greater than or equal to 0.95 MPa.

According to one preferred variant of the invention, the composition comprises from 20% to 40% of the inorganic binder and from 60% to 70% of the inert material in granule form.

According to another preferred variant of the invention, the fluid additive is present in the mortar composition at from 0.3% to 0.6%.

A preferred composition according to the invention is one which further comprises, as organic binder, from 1% to 10%, preferably 2% to 7%, of a copolymer comprising one (or more) vinyl ester(s) and optionally a maleic ester. Products of these kinds are presently available commercially, often in a mixture with inert fillers, such as, for example, Axilat™ UP 620E (approximately 90% by weight of copolymer of vinyl acetate, vinyl versatate, and maleic ester) and Axilat™ PAV 51 (approximately 90% by weight of copolymer of vinyl acetate and vinyl versatate), from Hexion.

According to one variant of the composition according to the invention, which is particularly preferred for its high adhesion performance, the composition comprises from 5% to 6% of copolymer of vinyl acetate, vinyl versatate, and maleic ester.

The mortar composition according to the invention may also comprise ingredients which are known in the art, such as:
- limestone, dolomite and/or silica fillers in the form of particles with a size of less than 50 μm, in an amount of from 0% to 25%, preferably from 2% to 15%;
- a rheological agent and/or water retainer, such as a cellulose ether, a guar gum or starch derivative, or else cellulose fibers, in an amount of from 0.3% to 1%, preferably from 0.3% to 0.7%;
- a (setting or hardening) accelerator, based for example on chloride or formate salts, in an amount of from 0.2% to 4%, preferably from 0.3% to 2%.

The mortar composition according to the invention is produced by simple mixing of the solid pulverulent ingredients and addition of the fluid additive by spraying.

The present invention also relates to the use of the mortar composition as defined above for mixing thereof with water, for the purpose of producing a mortar, a spackling or wall coating, a grout, or cement-based products used in construction.

Use for the purpose of producing an adhesive mortar for fixing ceramic tiles is especially preferred.

The examples which follow are given purely by way of illustration of the invention and should not be construed as limiting the scope thereof.

EXAMPLE A (REFERENCE)

Adhesive Mortar Composition without Fluid Additive

A pulverulent adhesive mortar composition A is prepared by simple dry mixing of the following ingredients:
30% of standardized Portland cement PC CEM I 52.5 N
63.6% of silica sand with a grain size of less than 500 μm
3% of a limestone filler with a size of less than 50 μm
2.4% of Axilat™ UP 620E
0.6% of an accelerator
0.4% of a rheological agent and/or water retainer.

The adhesion characteristics of the adhesive mortar A are determined by the adhesion test described below.

Adhesion Test:

The adhesive mortar composition is mixed with water, in a proportion of approximately 25 g of water to 100 g of powder, for 90 seconds.

Then, after a rest time of 5 minutes and homogenization with a spatula, the mixture is applied to 2 identical substrates each consisting of a square concrete slab with sides measuring 40 cm and a thickness of 4 cm, to form a thin layer which is suitably grooved by means of a notched spatula, its thickness being between 2 and 6 mm.

10 dry-pressed sandstone tiles with a side length of 5 cm and a thickness of 5 mm are subsequently placed onto each slab thus coated with adhesive, held in a horizontal position, and spaced apart by 5 cm. Each tile is then applied to the slab using a pressure resulting from the application of a 2 kg weight for 30 seconds.

The 2 resulting assemblies are subjected to the following storage conditions:
- one is left for 28 days at 23° C. and 50% relative humidity, for determination of the dry adhesion;
- the other is left for 7 days at 23° C. and 50% relative humidity, then immersed for 21 days in water at 23° C., for determination of the adhesion after water contact.

At the end of this storage, for each tile of the two aforementioned assemblies, a measurement is made of the force required to remove said tile from the concrete slab. For this purpose, metal tension elements with a square face having a side length of 5 cm are affixed to each tile by means of a high-strength epoxide-type structural adhesive. Each element is then connected to a tensile apparatus which is capable of applying to said element a tensile force which increases (until removal of the tile) at a constant rate of approximately 250 N/s.

The dry adhesion and the adhesion after water contact are obtained by relating the removal force measured for each of the 10 tiles to the surface area of a tile, then by calculating the average for each of the 2 corresponding assemblies. The 2 results are expressed in MPa and are given in Table 1.

For further details, reference is made to European standard EN 1348.

EXAMPLES A1-A4 (REFERENCE)

Effect of Adding 0.3% of a Hydrocarbon Oil on the Adhesion of Adhesive Mortar A

Example A is repeated, adding 0.3% by weight of the hydrocarbon oil indicated in Table 1 to the pulverulent composition by spraying.

The adhesion results likewise indicated in Table 1 are obtained.

EXAMPLE B (REFERENCE)

Adhesive Mortar Composition without Fluid Additive

Example A is repeated, replacing composition A by composition B below:
30% of standardized Portland cement PC CEM I 52.5 N
62.6% of silica sand with a grain size of less than 500 μm
3% of a limestone filler with a size of less than 50 μm
3% of Axilat™ UP 620E
0.7% of a rheological agent and/or water retainer
0.7% of an accelerator The adhesion results likewise indicated in Table 1 are obtained.

EXAMPLES B1-B3 (REFERENCE)

Effect of Adding 0.6% of a Hydrocarbon Oil on the Adhesion of Adhesive Mortar B

Example B is repeated, adding 0.6% by weight of the hydrocarbon oil indicated in Table 1 to the pulverulent composition.

The adhesion results likewise indicated in Table 1 are obtained.

EXAMPLE C (REFERENCE)

Adhesive Mortar Composition without Fluid Additive

Example A is repeated, replacing composition A by composition C below:
- 30% of standardized Portland cement PC CEM I 52.5 N
- 59.9% of silica sand with a grain size of less than 500 μm
- 3% of a limestone filler with a size of less than 50 μm
- 6% of Axilat™ UP 620E
- 0.7% of a rheological agent and/or water retainer
- 0.4% of an accelerator The adhesion results likewise indicated in Table 1 are obtained.

EXAMPLES C1-C3 (REFERENCE)

Effect of Adding 0.6% of a Hydrocarbon Oil on the Adhesion of Adhesive Mortar C

Example C is repeated, adding 0.6% by weight of the hydrocarbon oil indicated in Table 1 to the pulverulent composition.

The adhesion results likewise indicated in Table 1 are obtained.

Table 1, for the 3 adhesive mortars A, B, and C, shows a reduction in adhesion after water contact, resulting from the addition of 0.3% to 0.6% of the hydrocarbon oil indicated.

EXAMPLES 1 AND 2

Effect of Adding 0.3% or 0.6% of an Ester Oil (i) on the Adhesion of Adhesive Mortar B Example B is repeated, adding 0.3% or 0.6% by weight of diethyl adipate to the composition by spraying, as indicated in Table 2.

The adhesion results indicated in Table 2 are obtained.

EXAMPLES 3 TO 8

Effect of Adding 0.3% or 0.6% of an Ester Oil (i) on the Adhesion of Adhesive Mortar C Example C is repeated, adding 0.3% or 0.6% of the ester oil (i) to the pulverulent composition as fluid additive, indicated in Table 2.

The adhesion results likewise indicated in Table 2 are obtained.

EXAMPLES 9 TO 17

Effect of Adding 0.6% of a Fluid Additive Consisting of a Mixture of Ester Oil and Hydrocarbon Oil on the Adhesion of Adhesive Mortar C Example C is repeated, adding 0.6% of a fluid additive consisting of a mixture of (i) and (ii), in the percentages indicated in Table 3, to the pulverulent composition.

The adhesion results likewise indicated in Table 3 are obtained.

Compositions 1 to 17 according to the invention provide excellent dry adhesion performance, greater than that of the corresponding compositions without fluid additive (reference compositions B and C). They also produce an adhesion after water contact which is maintained substantially at the level of that provided by the reference compositions B and C, and especially greater than or equal to 0.95 MPa.

The emission of inhalable dusts by these same compositions 1 to 17 was evaluated visually relative to the reference compositions without fluid additive B and C: dust emission was found to be significantly reduced.

TABLE 1

|  | Example | A | A1 | A2 | A3 | A4 | B | B1 | B2 | B3 | C | C1 | C2 | C3 |
|---|---|---|---|---|---|---|---|---|---|---|---|---|---|---|
|  | Adhesive mortar | A | A | A | A | A | B | B | B | B | C | C | C | C |
| Amount of hydrocarbon oil (in %) | Hydroseal G3H | — | 0.3 | — | — | — | — | 0.6 | — | — | — | 0.6 | — | — |
|  | Semtol 70/28 | — | — | 0.3 | — | — | — | — | 0.6 | — | — | — | 0.6 | — |
|  | Nexbase 2002 | — | — | — | 0.3 | — | — | — | — | — | — | — | — | — |
|  | Lytol | — | — | — | — | 0.3 | — | — | — | 0.6 | — | — | — | 0.6 |
| Adhesion (in MPa) | Dry adhesion | 1.00 | 0.96 | 1.00 | 0.89 | 1.04 | 1.00 | 0.84 | 0.85 | 0.73 | 1.00 | 0.99 | 1.02 | 1.04 |
|  | Adhesion after water contact | 1.00 | 0.81 | 0.90 | 0.76 | 0.81 | 1.00 | 0.60 | 0.66 | 0.60 | 1.00 | 0.84 | 0.76 | 0.90 |

TABLE 2

| Example | B | 1 | 2 | C | 3 | 4 | 5 | 6 | 7 | 8 |
|---|---|---|---|---|---|---|---|---|---|---|
| Adhesive mortar | B | B | B | C | C | C | C | C | C | C |
| Amount of fluid additive (in %) | 0 | 0.3 | 0.6 | 0 | 0.6 | 0.3 | 0.6 | 0.6 | 0.6 | 0.6 |

TABLE 2-continued

| | Example | B | 1 | 2 | C | 3 | 4 | 5 | 6 | 7 | 8 |
|---|---|---|---|---|---|---|---|---|---|---|---|
| Amount of ester oil (i) in the fluid additive (in %) | 2-Ethylhexyl lactate | — | — | — | — | 100 | — | — | — | — | — |
| | Diethyl adipate | — | 100 | 100 | — | — | 100 | 100 | — | — | — |
| | Diisobutyl adipate | — | — | — | — | — | — | — | 100 | — | — |
| | Glycerol tricaprylate | — | — | — | — | — | — | — | — | 100 | — |
| | Pentaerythritol tetracaprylate | — | — | — | — | — | — | — | — | — | 100 |
| Adhesion (in MPa) | Dry adhesion | 1.00 | 1.01 | 1.42 | 1.00 | 1.35 | 1.43 | 1.65 | 1.44 | 1.50 | 1.26 |
| | Adhesion after water contact | 1.00 | 0.96 | 1.01 | 1.00 | 1.14 | 1.02 | 1.09 | 1.03 | 1.02 | 1.00 |

TABLE 3

| | Example | C | 9 | 10 | 11 | 12 | 13 | 14 | 15 | 16 | 17 |
|---|---|---|---|---|---|---|---|---|---|---|---|
| | Adhesive mortar | C | C | C | C | C | C | C | C | C | C |
| Amount of fluid additive (in %) | | 0 | 0.6 | 0.6 | 0.6 | 0.6 | 0.6 | 0.6 | 0.6 | 0.6 | 0.6 |
| Amount of ester oil (i) in the fluid additive (in %) | Diethyl adipate | — | 70 | 70 | 70 | 50 | 50 | 50 | 30 | 30 | 30 |
| Amount of hydrocarbon oil (ii) in the fluid additive (in %) | Hydroseal G3H | — | 30 | — | — | 50 | — | — | 70 | — | — |
| | Semtol 70/28 | — | — | 30 | — | — | 50 | — | — | 70 | — |
| | Lytol | — | — | — | 30 | — | — | 50 | — | — | — |
| Adhesion (in MPa) | Dry adhesion | 1.00 | 1.48 | 1.34 | 1.39 | 1.35 | 1.34 | 1.33 | 1.15 | 1.41 | 1.31 |
| | Adhesion after water contact | 1.00 | 1.07 | 1.08 | 1.00 | 1.03 | 0.95 | 0.97 | 1.03 | 0.99 | 1.06 |

The invention claimed is:

1. A pulverulent mortar composition which comprises:
from 10% to 60% of an inorganic binder,
from 40% to 90% of an inert material in granule form that can be agglomerated in aqueous phase by means of said binder,
from 0.2% to 1% of a fluid additive comprising at least 25% of a saturated or unsaturated linear or branched hydrocarbon compound (i) which is liquid at ambient temperature and which includes one or more ester groups —COO— of which the total weight, relative to the molar mass of said compound (i), is 22% to 50%, said fluid additive further comprising an apolar organic compound (ii), which is liquid at ambient temperature, said apolar organic compound (ii) being present in an amount of not more than 75% of the fluid additive, wherein compound (i) is 2-ethylhexyl lactate, diethyl adipate, diisobutyl adipate, glycerol tricaprylate or pentaerythritol tetracaprylate and compound (ii) is a mineral oil or a paraffin oil.

2. A pulverulent mortar composition which comprises:
from 10% to 60% of an inorganic binder,
from 40% to 90% of an inert material in granule form that can be agglomerated in aqueous phase by means of said binder,
from 0.2% to 1% of a fluid additive comprising from 25% to 100% of a saturated or unsaturated linear or branched hydrocarbon compound (i) which is liquid at ambient temperature and which includes one or more ester groups —COO— of which the total weight, relative to the molar mass of said compound (i), is between 20% and 50%, wherein the inorganic binder is cement, the inert material is sand, the composition contains a hardening accelerator that is a chloride or formate salt, and compound (i) is 2-ethylhexyl 2-hydroxypropanoate.

3. The pulverulent mortar composition as claimed in claim 2, wherein the fluid additive further comprises from 30% to 75% of an apolar organic compound (ii), which is liquid at ambient temperature.

4. The pulverulent mortar composition as claimed in claim 3, wherein the compound (ii) is a mineral oil, paraffinic oil, polyolefin, or mixtures thereof.

5. The pulverulent mortar composition as claimed in claim 3, wherein the fluid additive further comprises from 30% to 70% of the apolar organic compound (ii).

6. The pulverulent mortar composition as claimed in claim 3, wherein the fluid additive further comprises from 50% to 70% of the apolar organic compound (ii).

7. The pulverulent mortar composition as claimed in claim 2, comprising from 20% to 40% of the inorganic binder and from 60% to 70% of the inert material in granule form.

8. The pulverulent mortar composition as claimed in claim 2, comprising the fluid additive at from 0.3% to 0.6%.

9. A process for producing a mortar, a spackling, a wall coating, a grout, a cement-based product used in construction or an adhesive mortar for fixing ceramic tiles, comprising mixing water and a mortar composition according to claim 2.

10. A mortar, spackling, wall coating, grout, cement-based product, or adhesive mortar comprising a mortar composition according to claim 2.

11. A pulverulent mortar composition which comprises:
from 10% to 60% of an inorganic binder,
from 40% to 90% of an inert material in granule form that can be agglomerated in aqueous phase by means of said binder,
from 0.2% to 1% of a fluid additive comprising at least 25% of a saturated or unsaturated linear or branched hydrocarbon compound (i) which is 2-ethylhexyl lactate, said fluid additive further comprising an apolar organic compound (ii), which is liquid at ambient temperature, said apolar organic compound (ii) being present in an amount of not more than 75% of the fluid additive.

* * * * *